United States Patent
Berkman et al.

(10) Patent No.: US 7,149,148 B2
(45) Date of Patent: Dec. 12, 2006

(54) LOCALIZATION OF HIGH SPEED VEHICLES USING CONTINUOUS TRANSMIT WAVES

(75) Inventors: Evan Frank Berkman, Newton Centre, MA (US); Paul D. Koenigs, Matunuck, RI (US)

(73) Assignee: BBN Technologies Corp., Cambridge, MA (US)

( * ) Notice: Subject to any disclaimer, the term of this patent is extended or adjusted under 35 U.S.C. 154(b) by 292 days.

(21) Appl. No.: 10/809,005

(22) Filed: Mar. 25, 2004

(65) Prior Publication Data

US 2004/0264297 A1    Dec. 30, 2004

Related U.S. Application Data

(60) Provisional application No. 60/483,713, filed on Jun. 30, 2003.

(51) Int. Cl.
*G01S 15/00* (2006.01)

(52) U.S. Cl. .................. 367/100; 367/99; 342/145

(58) Field of Classification Search .................. 367/99, 367/100, 101; 342/21, 128, 145
See application file for complete search history.

(56) References Cited

U.S. PATENT DOCUMENTS

| | | | | |
|---|---|---|---|---|
| 5,194,870 A | * | 3/1993 | Pearce et al. | 342/128 |
| 5,657,022 A | * | 8/1997 | Van Etten et al. | 342/145 |
| 6,664,919 B1 | * | 12/2003 | Isaji | 342/145 |

* cited by examiner

*Primary Examiner*—Ian J. Lobo
(74) *Attorney, Agent, or Firm*—Fish & Neave IP Group

(57) ABSTRACT

The selection of multiple, suitably designed, demodulation reference signals can enable the measurement of a vehicle's speed using continuously transmitted frequency modulated (CTFM) signals. The unique solution of vehicle speed can be used to resolve the range Doppler ambiguity found in conventional CTFM sonar and radar systems. This can enable continuous range and speed estimates of high-speed vehicles with an attendant reduction in transmit power relative to pulse-echo systems with similar measures of performance due to the 100% duty cycle.

24 Claims, 10 Drawing Sheets

LOCALIZATION OF HIGH SPEED VEHICLES USING CONTINUOUS TRANSMIT WAVES

RELATED APPLICATIONS

This application claims priority to, and incorporates by reference, the entire disclosure of U.S. Provisional Patent Application No. 60/483,713 filed on Jun. 30, 2003.

GOVERNMENT INTEREST

The disclosed methods and systems were made at least in part based on function by the Naval Undersea Warfare Center under Contract No. N66604-00-D-151A. The U.S. Government may have rights in the disclosed methods and systems.

FIELD

The systems and methods relate to vehicle detection, and more particularly to vehicle localization using continuously transmitted frequency modulated signals.

BACKGROUND

A sonar (or radar) system that is capable of continuously transmitting and receiving Continuous Wave (CW) signals can determine a vehicle's speed by measuring the Doppler shift but cannot measure range. If the continuous transmission is frequency modulated and the vehicle is stationary, the range to the vehicle may be determined by measuring the frequency difference between the transmitted signal and the received echo. This concept is used quite extensively in altimeters, police radars, Doppler navigators, and personnel motion detectors (Radar Handbook, McGraw-Hill, M. I. Skolnik, editor). Past techniques to obtain the difference frequency have used the transmitted signal waveform as the demodulating signal.

However, if the vehicle is moving, the instantaneous difference between the transmitted and received echo is dependent on range, range rate and, to a lesser degree, time. The interdependency results in range Doppler ambiguity found in conventional continuously transmitted frequency modulated (CTFM) sonar and radar systems. While Pulse-Echo (PE) sonar/radar systems have been developed for determining speed and range of target vehicles, such systems typically require significantly higher peak power than CTFM systems with equivalent detection and localization performance because the PE system typically operate at low duty cycle whereas as a CTFM system works at or near 100% duty cycle. Thus, CTFM can have the advantage of requiring substantially lower transmitted power and correspondingly smaller transmitters than equivalent performance PE systems. A CTFM system can also provide faster update rates. Thus, a CTFM system that can resolve the range Doppler ambiguity can have significant advantages over known PE systems.

SUMMARY

Systems and methods described herein can provide for the selection of multiple, suitably designed, demodulation reference signals enabling the measurement of a vehicle's speed without ambiguity due to range of separation using continuously transmitted frequency modulated (CTFM) signals. The unique solution of vehicle speed can then be used to resolve the range Doppler ambiguity found in conventional CTFM sonar and radar systems. This disambiguation can enable continuous range and speed estimates of high-speed vehicles with an attendant reduction in transmit power relative to pulse-echo systems with similar measures of performance due to the 100% duty cycle of the CTFM system.

In one embodiment, a method of localizing a target can include transmitting a continuous waveform signal, receiving an echo signal from the target, demodulating the echo signal to a baseband, estimating a rangewise Mach number, $M_r$, based on combining energy in cells along hypothesized tracks of a frequency-time diagram for the echo signal, and determining a first range of the target based on the estimated rangewise Mach number.

The method can include estimating a rangewise Mach number by choosing a frequency detection binwidth, $\delta f_{min}$, for the cells from the relationship:

$$\delta f_{min} = \frac{B_{min}}{Q} = \frac{4 M_r Q}{T},$$

where:
  $B_{min}$ is the minimum bandwidth of the continuous waveform signal, and
  Q is the number of cells in a cycle time, T.

The method can include estimating a rangewise Mach number using matched filters having a minimum baseband frequency resolution, $\delta f_{min}$, of:

$$\delta f_{min} = \sqrt{\frac{2 f_0}{QT}},$$

where:
  $f_0$ is the initial frequency of the continuous waveform signal, and
  Q is the number of cells in a cycle time, T.

Demodulating can include mixing the echo signal with the continuous waveform signal using dual extended duration interlaced demodulation signals or dual frequency band demodulation signals. In one aspect, demodulating can include mixing the echo signal with the continuous waveform signal using dual frequency band demodulation reference signals to demodulate the echo signal to a pass band to obtain a demodulated echo signal, and demodulating the demodulated echo signal to bring the demodulated echo signal down to the baseband. The demodulated echo signal can be band passed filtered prior to demodulating.

Transmitting the continuous waveform signal can include determining a frequency separation, transmitting a continuous waveform upsweep signal, and transmitting a concurrent continuous waveform downsweep signal, wherein the upsweep and downsweep signals have the determined frequency separation. Demodulating the echo signal can include demodulating an upsweep echo signal to baseband to obtain an upsweep baseband frequency for the upsweep echo signal, and demodulating a downsweep echo signal to baseband to obtain a downsweep baseband frequency for the downsweep echo signal. Determining the range can include combining the upsweep baseband frequency and the downsweep baseband frequency to determine a range rate and a second range of the target. Combining can include determining a sum and a difference of the upsweep baseband frequency and the downsweep baseband frequency to determine the range rate and second range, respectively, and combining the first and second ranges to localize the target.

Determining the first range can include estimating a frequency difference, Δf, between said transmit signal and said echo signal, and solving for the first range using the relationship:

$$r = -\frac{c}{2\dot{f}_o(1-2M_r)}\left[\frac{\Delta f}{(1-M_r)} + 2m_r f_o + 4M_r(1-M_r)\dot{f}_o T_0\right],$$

where
$f_0$ is an initial frequency of said continuous waveform signal, and
$T_0$ is and observation time less than a cycle time T.

A method of localizing a target can include determining a frequency separation for non-overlapping frequency reception, transmitting continuous waveform upsweep and downsweep signals separated by the determined frequency separation, receiving an upsweep and downsweep echo signal from the target, demodulating the upsweep and downsweep echo signals to baseband, and combining the upsweep baseband frequency and the downsweep baseband frequency to determine a range of the target. Combining the upsweep and downsweep baseband frequencies can include determining a sum and a difference of the upsweep baseband frequency and the downsweep baseband frequency to determine a range rate and range, respectively, of the target.

The frequency separation can be determined based on maintaining the frequency separation at least as large as a potential Doppler shift taken from a relationship $f_1-f_2=4M_{max}f_0$, wherein the Doppler shifts of the continuous waveform upsweep and downsweep signals are expressed as $f_u=f_1+f_0 t$ and $f_d=f_2+f_0 t$, respectively, where $M_{max}$ is a maximum rangewise Mach number, and $$f_0 \equiv \left(\frac{f_1+f_2}{2}\right).$$

The sum of the upsweep baseband frequency and the downsweep baseband frequency can be based on the relationship $\Delta f_d(t)+\Delta f_u(t)=-2M_r(f_2+f_1)$. The difference of the upsweep baseband frequency and the downsweep baseband frequency can be based on the relationship $\Delta f_d(t)-\Delta f_u(t)=+2\tau_0 f_0(1-2M_r)+8M_r(1-M_r)\dot{f}_0 t-2M_r(f_2-f_1)$, where $$\tau_o \equiv \frac{2r}{c},$$

r is the range, and c is speed in the medium of concern.

Demodulating the upsweep echo signal and the downsweep echo signal can include mixing the upsweep echo signal with the continuous waveform upsweep signal, and mixing the downsweep echo signal with the continuous waveform downsweep signal, wherein the mixing can use dual extended duration interlaced demodulation signals, or dual frequency band demodulation signals.

A system for localizing a target can include a transmitter to transmit a continuous waveform signal, a receiver to receive an echo signal from the target, and a signal processor to demodulate the echo signal to baseband, estimate a rangewise Mach number, $M_r$, based on combining energy in cells along hypothesized tracks of a frequency-time diagram for the echo signal, and determine a range of the target based on the range wise Mach number.

In one embodiment, a system for localizing a target can include means for transmitting a continuous waveform signal, means for receiving an echo signal from the target, means for demodulating the echo signal to baseband, means for estimating a rangewise Mach number, $M_r$, based on combining energy in cells along hypothesized tracks of a frequency-time diagram for the echo signal, means for determining a range of the target based on the rangewise Mach number.

In one embodiment, a system for localizing a target can include means for determining a frequency separation, means for transmitting a continuous waveform upsweep signal, $f_u$, means for transmitting a concurrent continuous waveform downsweep signal, $f_d$, said upsweep signal and said downsweep signal having said frequency separation, means for receiving an upsweep echo signal from said target, means for receiving a downsweep echo signal from said target, means for demodulating said upsweep echo signal to baseband to obtain an upsweep baseband frequency for said upsweep echo signal, means for demodulating said downsweep echo signal to baseband to obtain a downsweep baseband frequency for said downsweep echo signal, and means for combining said upsweep baseband frequency and said downsweep baseband frequency to determine a range of said target.

A computer-readable medium can contain instructions for controlling a computer system to localize a target by controlling said computer system to transmit a continuous waveform signal, receive an echo signal from the target, demodulate the echo signal to baseband, estimate a rangewise Mach number, $M_r$, based on combining energy in cells along hypothesized tracks of a frequency-time diagram for the echo signal, and determine a range of the target based on the rangewise Mach number.

The instructions can include instructions to choose a frequency detection binwidth, $\delta f_{min}$, for the cells from the relationship:

$$\delta f_{min} = \frac{B_{min}}{Q} = \frac{4M_r Q}{T},$$

where:
$B_{min}$ is the minimum bandwidth of the continuous waveform signal, and
Q is the number of cells in a cycle time, T.

The instructions can include instructions to estimate a rangewise Mach number using matched filters having a minimum baseband frequency resolution, $\delta f_{min}$, of:

$$\delta f_{min} = \sqrt{\frac{2f_0}{QT}},$$

where:
$f_0$ is the initial frequency of the continuous waveform signal, and
Q is the number of cells in a cycle time, T.

The instructions to demodulate can include instructions to mix the echo signal with the continuous waveform signal using dual extended duration interlaced demodulation signals or dual frequency band demodulation signals. In one aspect, the instructions to demodulate can include instructions to mix the echo signal with the continuous waveform signal using dual frequency band demodulation reference signals to demodulate the echo signal to a pass band to obtain a demodulated echo signal, and demodulate the demodulated echo signal to bring the demodulated echo signal down to the baseband. The instructions can include instructions to band pass the demodulated echo signal prior to demodulating.

The instructions to transmit the continuous waveform signal can include instructions to determine a frequency separation, transmit a continuous waveform upsweep signal, and transmit a concurrent continuous waveform downsweep signal, wherein the upsweep and downsweep signals have the determined frequency separation. The instructions to demodulate the echo signal can include instructions to demodulate an upsweep echo signal to baseband to obtain an upsweep baseband frequency for the upsweep echo signal, and demodulate a downsweep echo signal to baseband to obtain a downsweep baseband frequency for the downsweep echo signal.

The instructions to determine the range can include instructions to combine the upsweep baseband frequency and the downsweep baseband frequency to determine a range rate and a second range of the target. The instructions to combine can include instructions to determine a sum and a difference of the upsweep baseband frequency and the downsweep baseband frequency to determine the range rate and second range, respectively, and combine the first and second ranges to localize the target.

The instructions to determine the first range can include instructions to estimate a frequency difference, $\Delta f$ between said transmit signal and said echo signal, and solving for the first range using the relationship:

$$r = -\frac{c}{2\dot{f}_o(1-2M_r)}\left[\frac{\Delta f}{(1-M_r)} + 2m_r f_o + 4M_r(1-M_r)\dot{f}_o T_0\right],$$

where
  $f_0$ is an initial frequency of said continuous waveform signal, and
  $T_0$ is and observation time less than a cycle time T.

In one embodiment, a computer-readable medium can include instructions to control a processor to localize a target. The instructions can include instructions to determine a frequency separation for non-overlapping frequency reception, transmit continuous waveform upsweep and downsweep signals separated by the determined frequency separation, receive an upsweep and downsweep echo signal from the target, demodulate the upsweep and downsweep echo signals to baseband, and combine the upsweep baseband frequency and the downsweep baseband frequency to determine a range of the target. The instructions to combine the upsweep and downsweep baseband frequencies can include instructions to determine a sum and a difference of the upsweep baseband frequency and the downsweep baseband frequency to determine a range rate and range, respectively, of the target.

The instructions to determine a frequency separation include instructions to maintain the frequency separation at least as large as a potential Doppler shift taken from a relationship $f_1-f_2=4M_{max}f_0$, wherein the Doppler shifts of the continuous waveform upsweep and downsweep signals are expressed as $f_u=f_1+\dot{f}_0 t$ and $f_d=f_2+\dot{f}_0 t$, respectively, where $M_{max}$ is a maximum rangewise Mach number, and $$f_0 \equiv \left(\frac{f_1+f_2}{2}\right).$$

The instructions for determining a sum of the upsweep baseband frequency and the downsweep baseband frequency can be based on the relationship $\Delta f_d(t)+\Delta f_u(t)=-2M_r(f_2+f_1)$. The instructions for determining a difference of the upsw baseband frequency and the downsweep baseband frequency can be based on the relationship $\Delta f_d(t)-\Delta f_u(t)=+2\tau_0 \dot{f}_0(1-2M_r)+8M_r(1-M_r)\dot{f}_0 t-2M_r(f_2-f_1)$, where $$\tau_o \equiv \frac{2r}{c},$$

r is the range, and c is speed in the medium of concern.

The instructions to demodulate the upsweep echo signal and the downsweep echo signal can include instructions to mix the upsweep echo signal with the continuous waveform upsweep signal, and mix the downsweep echo signal with the continuous waveform downsweep signal, wherein the mixing can use dual extended duration interlaced demodulation signals, or dual frequency band demodulation signals.

BRIEF DESCRIPTION OF THE DRAWINGS

The following figures depict certain illustrative embodiments in which like reference numerals refer to like elements. These depicted embodiments are to be understood as illustrative and not as limiting in any way.

DETAILED DESCRIPTION OF THE PREFERRED EMBODIMENTS

Figure 1:
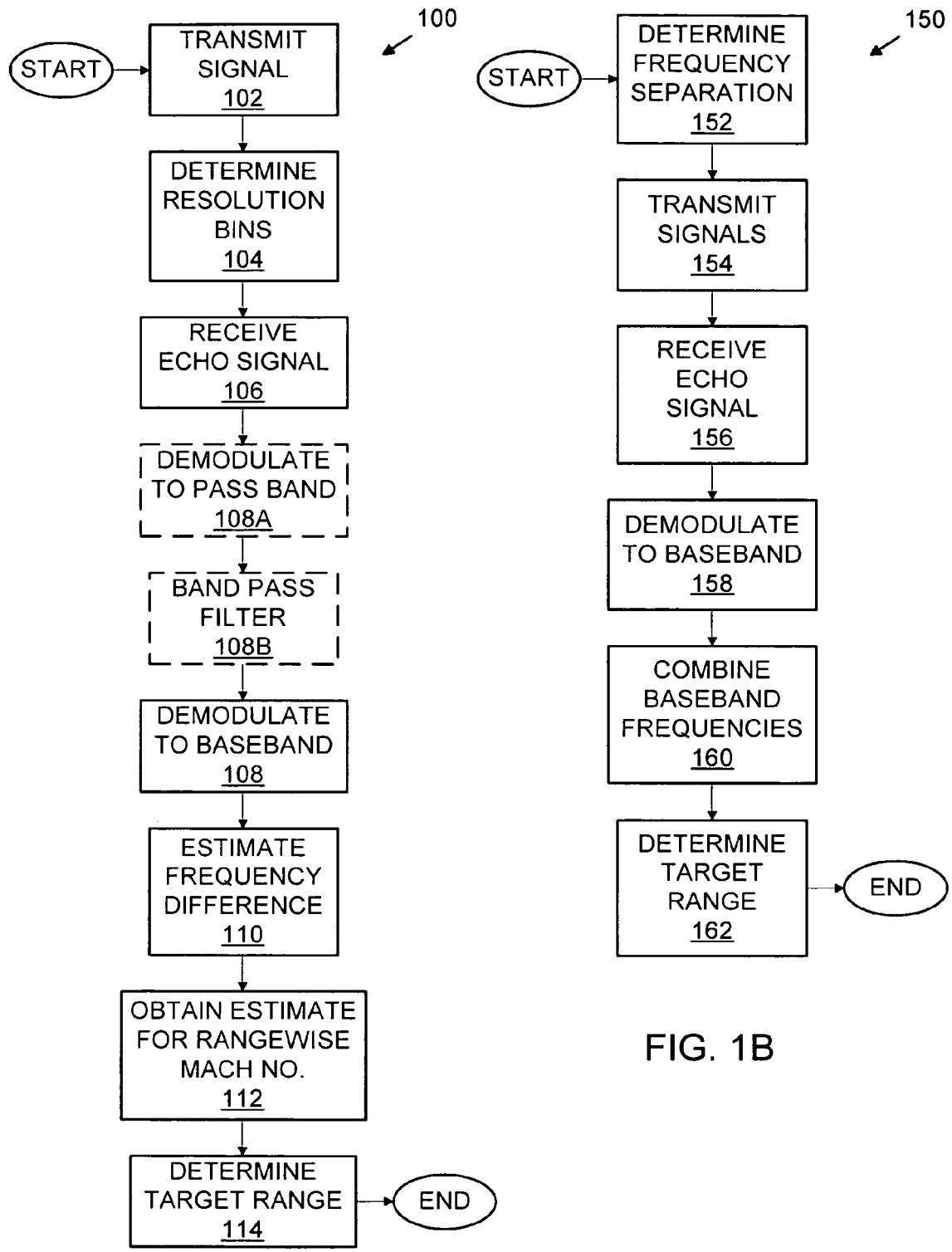
FIG. 1A illustrates a flow chart of an embodiment of a method of localizing a target vehicle using continuously transmitted frequency modulated signals.
FIG. 1B illustrates a flow chart of an embodiment of a method of localizing a target vehicle using upsweep and downsweep continuously transmitted frequency modulated signals.

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

As previously described, current sonar/radar systems capable of continuously transmitting and receiving Continuous Wave (CW) signals can determine a vehicle's speed by measuring the Doppler shift, but cannot measure range; and Continuous Transmission Wave Frequency Modulated (CTFM) signals can determine range for assumed nearly stationary targets. However, current CTFM sonars cannot measure either speed or range unambiguously when speed is significant. However, for CTFM signals the time dependent change in the difference between transmitted and received frequencies depend only on range rate and this dependency can be exploited to determine range rate and then that determination can be used to determine range unambiguously. The systems and methods described herein measure the time dependent component of the difference frequency by using a family of demodulating signals parameterized by range rate covering the expected span of vehicle range rates and either searching for maximum output among this family of filters or searching among the filter set for the filter that eliminates the time dependency of the frequency difference. The demodulator signal parameter, and thus the assumed range rate, that maximizes filter output or produces a time independent solution can be used to determine an unambiguous range rate and related Doppler shift. The Doppler shift can be subtracted from the difference frequency and the resultant can be used to obtain an unambiguous range estimate.

A CTFM sonar/radar using a set of speed dependent demodulating signals for tracking high speed vehicles can require somewhat more bandwidth (for range resolution) and processing channels (for range rate resolution) than a comparable PE sonar/radar. Additionally, design considerations for a CTFM sonar/radar system include not overloading the receiver by the transmitted signal. However, such considerations can be outweighed by the benefits provided by a CTFM sonar/radar system, including lower peak power requirements, a smaller transmit section, and faster update rates. To provide a better understanding of the CTFM sonar/radar systems and methods described herein, some basic principles of such systems will be described further below. For ease of explanation, the systems and methods can be described herein in relation to sonar systems. However, it can be understood that the systems and methods described herein can be applicable to other systems that can utilize CTFM signals to localize target vehicles or other objects of interest.

Continuous transmission (CT) sonar typically can include a cyclical, linear, frequency modulated (FM) transmit waveform with a 100% duty cycle. Receivers used in CT sonar systems can include a dynamic demodulator and a bank of narrowband filters and narrowband energy detectors. The dynamic demodulator can be such that the transmit signal dynamically demodulates the received signal to baseband. Thus, as is known, the demodulated echo from a target at a constant range is a constant frequency, or tone, with the frequency proportional to range. The bank of filters and detectors can correspond to range cells.

Waveform and processing parameters for CT sonar can include:

T: cycle time period, cycle duration, repetition rate for CT;

B: sweep bandwidth, total bandwidth;

$f_0$: initial frequency;

δf: receiver frequency resolution; and $T_0$: receiver averaging/response time where $1/δf < T_0 < T$.

The transmitted signal can be expressed as:

$$s(t) = \sum_n s_o(t - nT); \quad [1]$$

$$s_0(t) = Re[S_0 e^{j\phi(t)}] \cdot u_T(t); \quad [2]$$

$$\phi(t) = \omega_o t + \frac{1}{2}\dot{\omega}_o t^2 = 2\pi\left(f_o t + \frac{1}{2}\dot{f}_o t^2\right); \quad [3]$$

$$f_{xmit}(t) = \frac{1}{2\pi}\dot{\phi}(t) = f_o + \quad [4]$$

$\dot{f}_o t$: instantaneous transmit frequency, and $$\dot{f}_o \equiv \frac{B}{T} : \text{sweep rate}; \quad [5]$$

where $S_0 = |S_0| \cdot e^{j\Phi}$;

φ: arbitrary phase;

$|S_0|^2$: source level at reference distance; and $u_T(t)$: unit amplitude window function of time duration T.

Figure 3A:
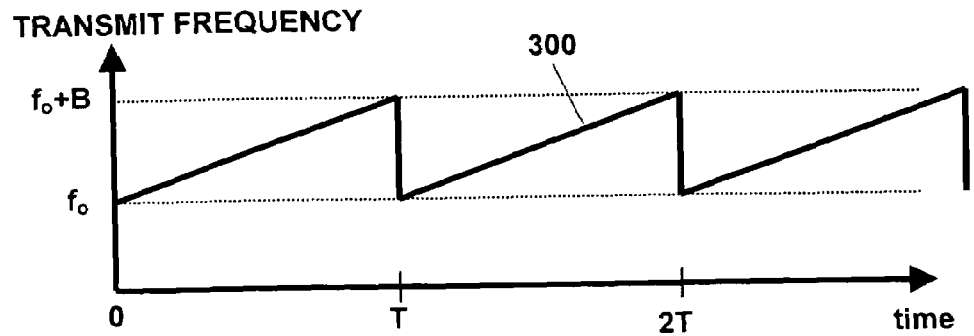
FIGS. 3A–3C illustrate frequency-time tracks for a transmitted upsweep CTFM waveform, the transmitted and echo waveforms, and the demodulated waveform, respectively.

FIG. 3A can illustrate an example of an upsweep CTFM waveform 300.

Figure 3B:
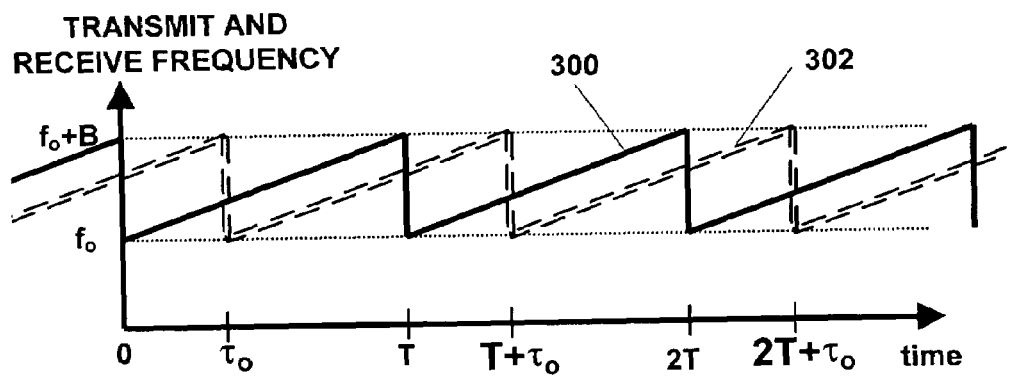

Consider an ideal case of a stationary target and stationary transmitter and receiver and negligible range/time spread in the two-way transmission and in the target or target highlight echo response (i.e., "point" target). This ideal may be well approximated for source, receiver, and target motion sufficiently slow that the relative range rate between source and target and receiver and target produces negligible change in range relative to range resolution during any "snapshot" processing interval. In this case, the echo 302 is a time delayed scaled replica of the transmitted waveform 300, as indicated in FIG. 3B. The difference in instantaneous frequencies between echo and transmitted signals in the latter part of the cycle will be proportional to range:

$$0 < t < \tau_0 : \Delta f = \left(1 - \frac{\tau_o}{T}\right) B \text{ and} \quad [6]$$

$$\tau_0 < t < T : \Delta f = -\dot{f}_0 \cdot \tau_o = -\frac{\tau_o}{T} B, \text{ where} \quad [7]$$

$$\Delta f = f_{echo} - f_{xmit} \text{ and} \quad [8]$$

$$\tau_o \equiv \frac{2r}{c} : \text{range information} \quad [9]$$

Where $r$ is range and $c$ is speed in the media.

Figure 3C:
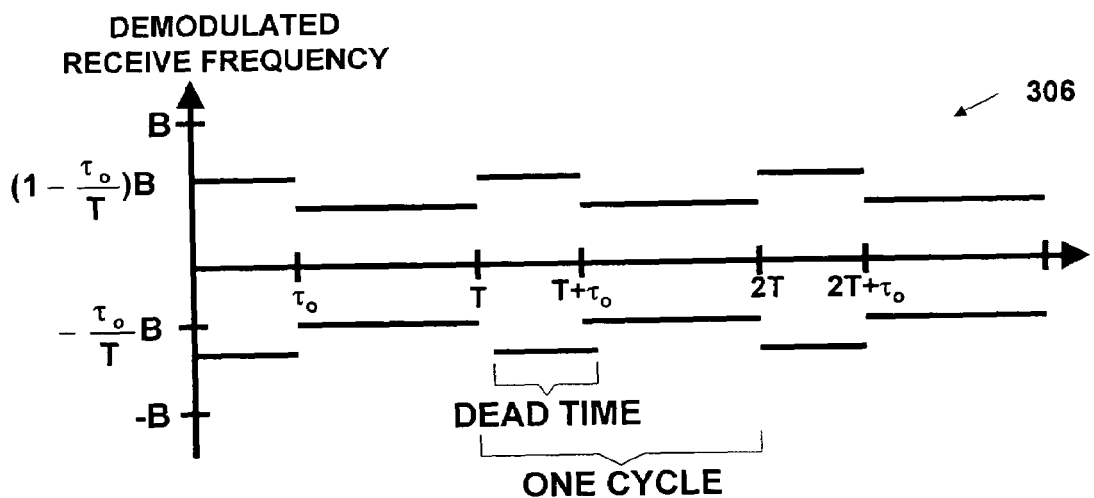

To remove known dynamics of the frequency of the transmitted and echo signals before estimating the frequency difference, a dynamic demodulation of the echo to baseband can be obtained by mixing with the transmit signal, as in FIG. 3C to obtain demodulated waveform 306. For this case, the baseband frequency can equal $\Delta f$, as shown above. The initial time in each cycle that frequency is not proportional to range is referred to in the art as "dead time." Older CT systems dealt with dead time by using cycle durations that were much longer than the two-way propagation time to the maximum range of operation so that dead time is a relatively small fraction of the total cycle time with penalties of more required bandwidth and/or reduced range resolution.

Figure 3D:
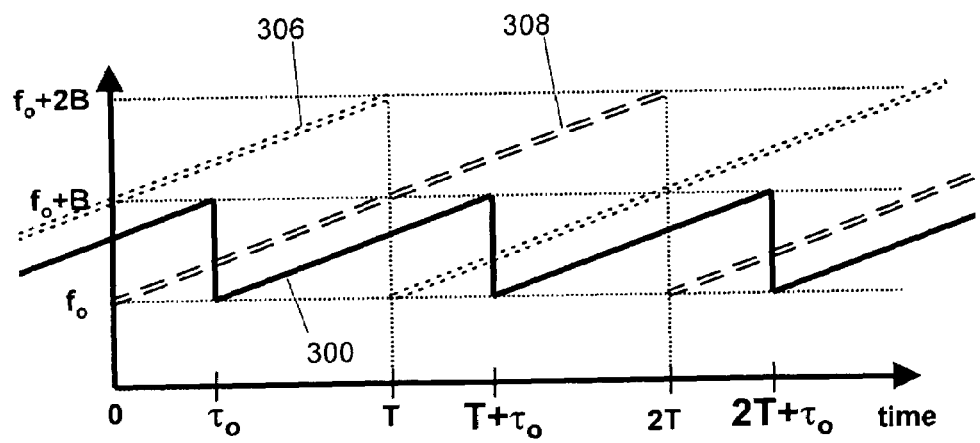
FIGS. 3D and 3E illustrate frequency-time tracks for a transmitted upsweep CTFM waveform with dual extended duration interlaced demodulation reference signals and the demodulated waveform, respectively.
Figure 3E:
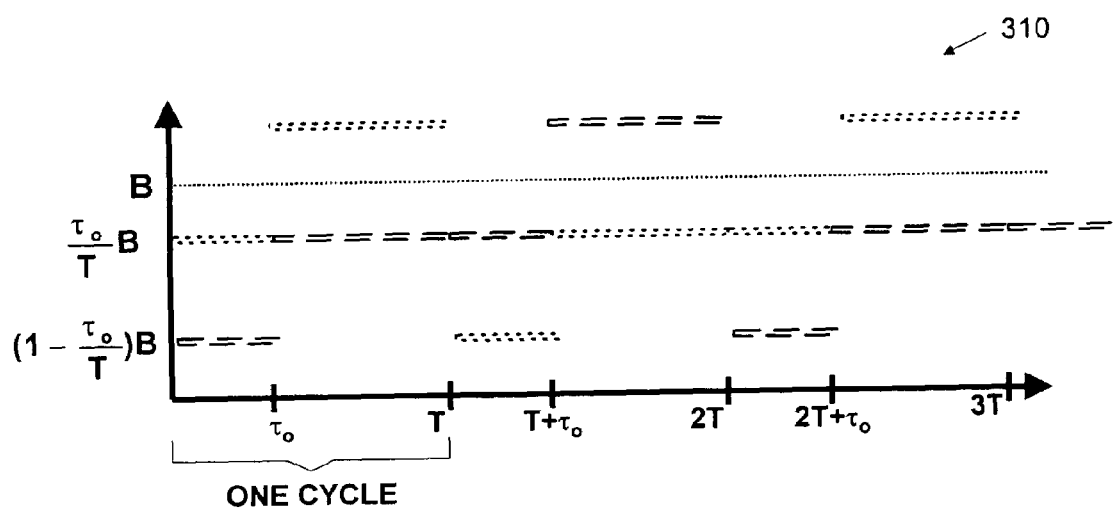
Figure 3F:
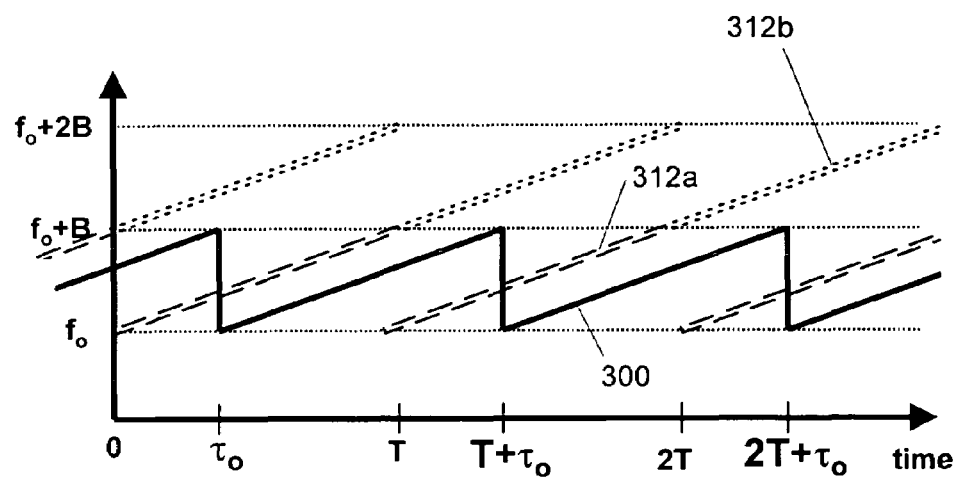
FIGS. 3F and 3G illustrate frequency-time tracks for a transmitted upsweep CTFM waveform with dual frequency band demodulation reference signals and the demodulated waveform, respectively.
Figure 3G:
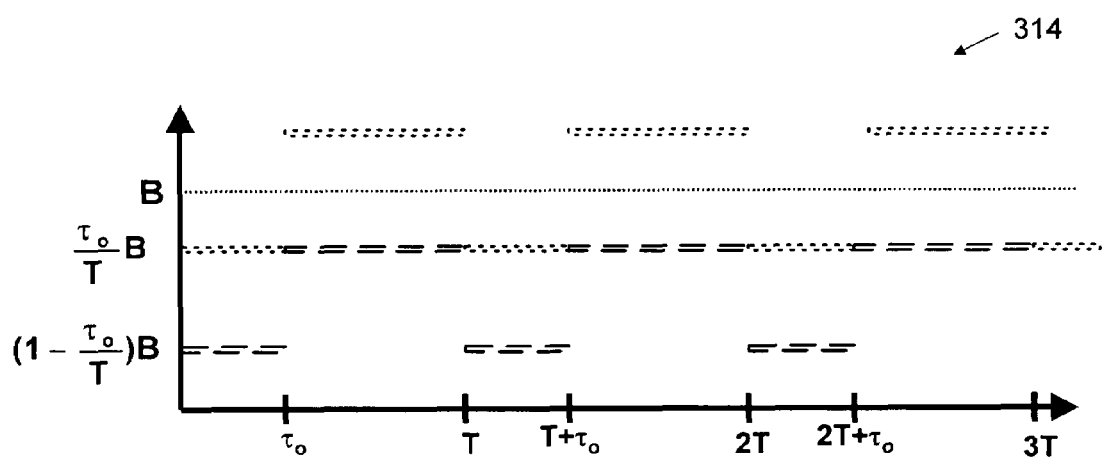
Figure 3H:
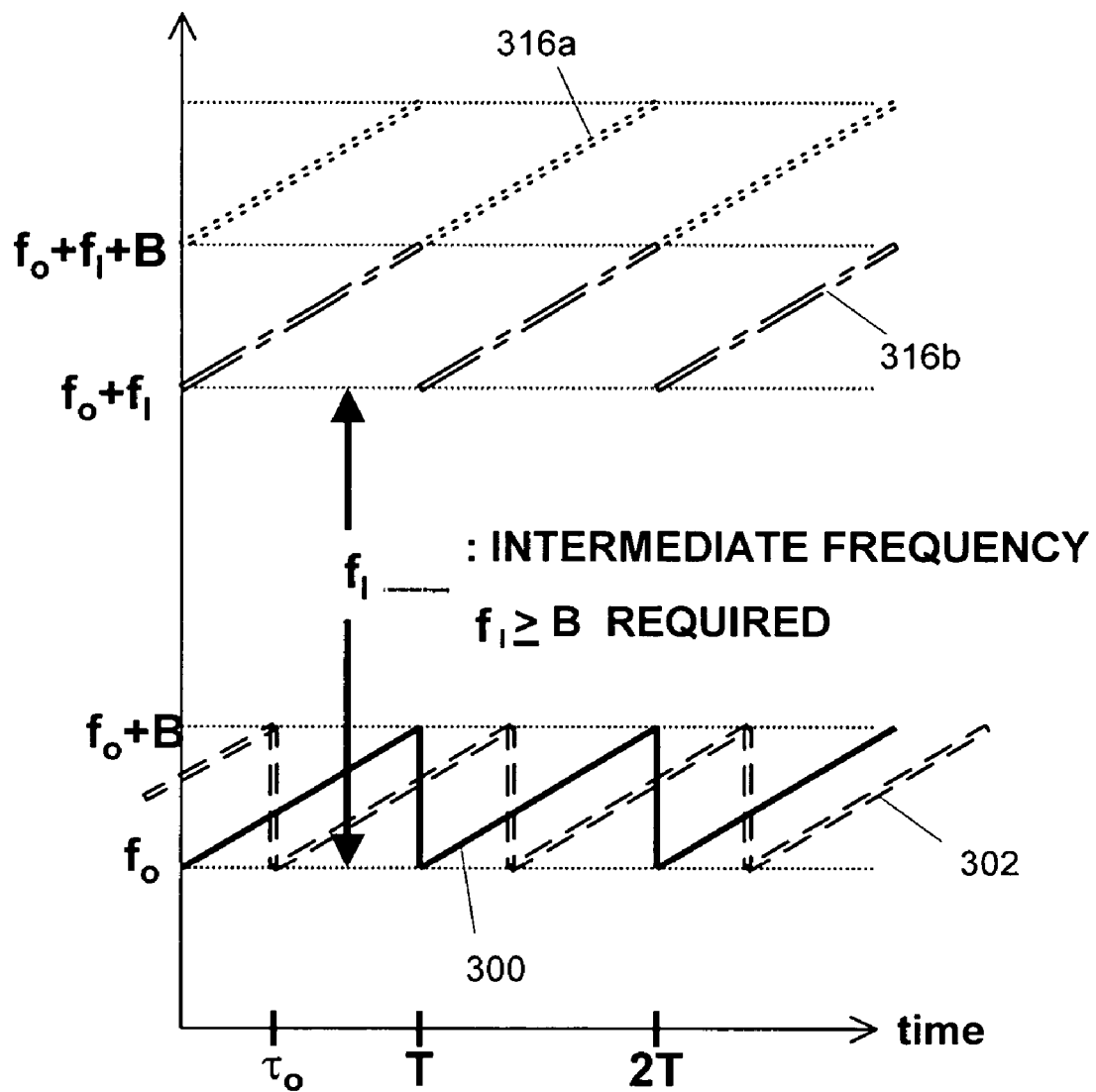
FIGS. 3H and 3I illustrate frequency-time tracks for a transmitted upsweep CTFM waveform with demodulation to intermediate band with dual frequency band demodulation reference signals and the demodulated waveform, respectively.

However, recently developed and documented contemporary methods can eliminate dead time at the expense of receiver complexity with no other performance or projector requirement penalties. Such methods can include: (1) demodulation to baseband with dual extended duration interlaced demodulation reference signals 306, 308 (FIG. 3D), as shown at 310 in FIG. 3E; (2) demodulation to baseband with dual frequency band demodulation reference signals 312a, 312b (FIG. 3F), as shown at 314 in FIG. 3G; and (3) demodulation to intermediate band with dual frequency band demodulation reference signals 316a, 316b (FIG. 3H), as shown at 318 in FIG. 3I. The preferred methods among these options may depend on total system engineering tradeoffs.

Figure 3I:
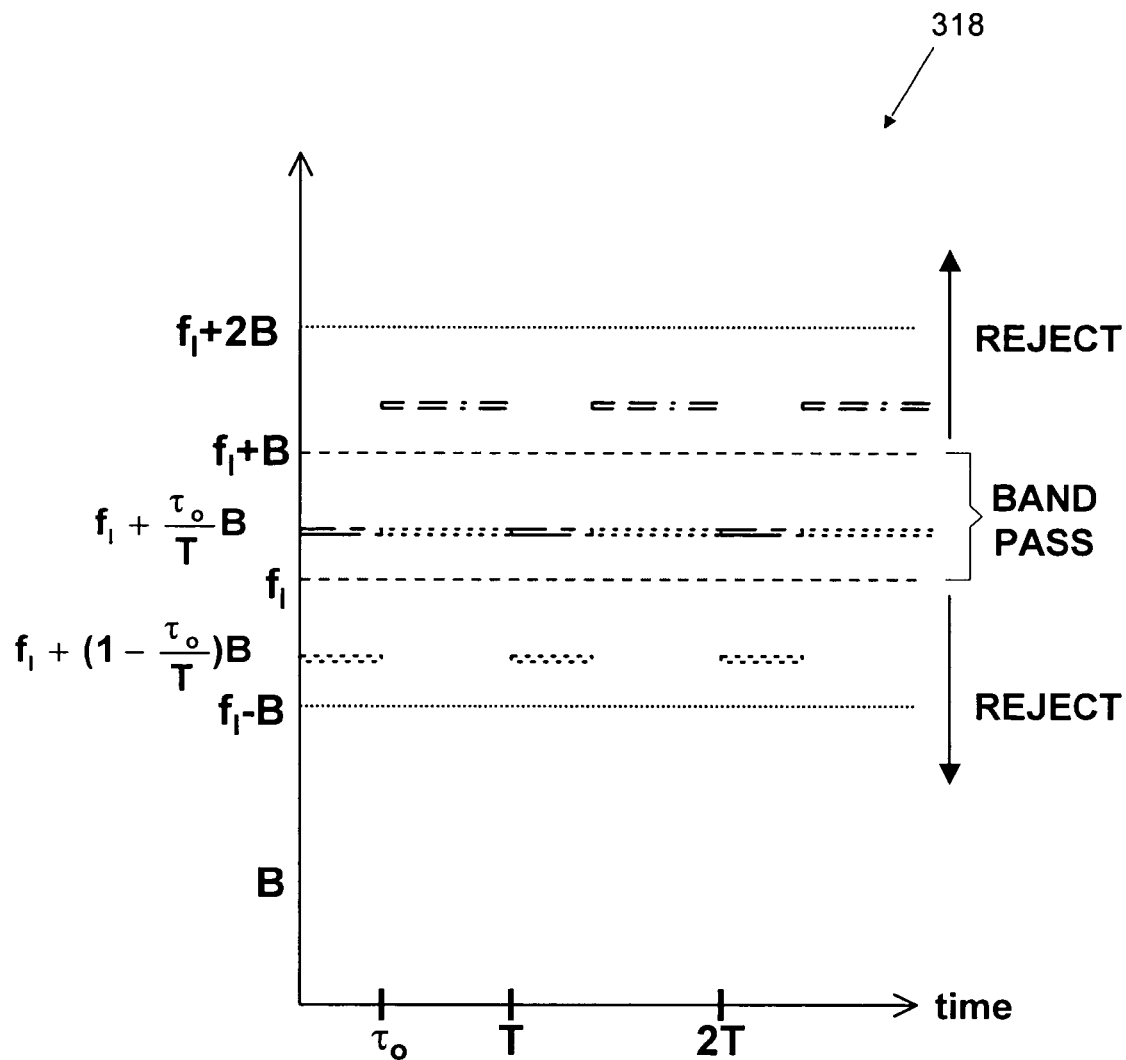

In methods (1) and (2), a low pass filter rejects frequencies above frequency B and the steady tone is proportional to the range in sum of the two demodulation channels (no dead time). For method (2), the first demodulation reference is the transmit Linear Frequency Modulated (LFM) signal and the second demodulation reference is shifted up in frequency by B with regard to the first demodulation reference. For both methods (1) and (2), confusing signals can still remain within baseband sweep band and bandwidth B, respectively. In method (3), frequencies above and below the pass band are rejected. After demodulation to the intermediate band, as shown in FIG. 3I, a second demodulation brings the echo tonal in the pass band down to the base band.

For the exemplary stationary target, a number of relationships can be developed. The number of time resolution bins is:

$$\frac{\text{cycle time duration}}{\text{time resolution}} = \frac{T}{1/B} = BT.$$

From Equations 7 and 9 and with $$T = \frac{2R_{max}}{c}, \text{ then } \Delta f = -\frac{r}{R_{max}} B.$$

Thus, range resolution, $\delta r$, can be related to frequency resolution, $\delta f$, by $$\delta f = -\frac{\delta r}{R_{max}}$$

B to yield the number of distinctly resolvable range cells as:

$$Q \equiv \frac{R_{max}}{\delta r} = \frac{B}{\delta f}, \quad [10]$$

so that the number of range resolution bins equals the number of frequency resolution bins. Noting that $$\delta f_{min} = \frac{1}{T_0},$$

the maximum number of resolvable range bins within observation time $T_0 \leq T$ can be given by:

$$Q_{max} = \frac{R_{max}}{\delta r_{min}} = \frac{B}{\delta f_{min}} = BT_0. \quad [11]$$

Conversely, the required frequency resolution, $\delta f$ can be driven by the required range resolution, $\delta r$, such that $$\delta f = \frac{B}{Q}$$

from Equation 10. In order to maximize the Signal to Noise Ratio (SNR), one can select the minimum value of $\delta f$ consistent with the cycle duration T, which for the ideal stationary target case considered is $$\delta f_{min} = \frac{1}{T}.$$

Thus, from Equation 11, the minimum swept frequency, $B_{min}$, is reciprocal to the time resolution needed to obtain the desired spatial resolution: $B_{min} = Q \cdot \delta f_{min}$.

Considering a minimum frequency resolution for observation time $T_0$ less than cycle time T, with $$\delta f_{min} = \frac{1}{T_0},$$

then $$B_{\min} = Q \cdot \delta f_{\min} = \frac{Q}{T_0} = \frac{Q}{T} \cdot \frac{T}{T_0} = \frac{c}{2 \cdot \delta r} \cdot \frac{T}{T_0}.$$

In other words, if the desired response time is less than the cycle time, the minimum total swept frequency B must be increased proportional to $T/T_0$. Similarly, the swept frequency in the observation interval $T_0$ is a factor $T_0/T$ of the total swept frequency. Thus, the swept frequency in a desired response time interval $$\frac{T_0}{T} B$$

must be reciprocal to the time resolution $$\frac{c}{2 \cdot \delta r}$$

needed to obtain the desired spatial resolution.

Thus, for a stationary target and given the maximum range, $R_{max}$ the desired range resolution, $\delta r$, and the desired response/update time, one can determine the cycle time, T, the sweep bandwidth, B, the initial frequency, $f_0$, and the processing frequency resolution, $\delta f$, from the above relationships. As an example, for $R_{max}$=6 km, $\delta r$=10 m, $T_0$=1 sec, and with c being 1500 m/sec:

$$T = \frac{2R_{\max}}{c} = \frac{2*6000}{1500} = 8 \sec s;$$

$$\delta f_{\min} = \frac{1}{T_0} = \frac{1}{1} = 1 \text{ Hz};$$

$$Q = \frac{R_{\max}}{\delta r} = \frac{6000}{10} = 600;$$

B=Q·δf=600*1=600 Hz; and the frequency sweep rate, B/T=600/8=75 Hz/sec.

As noted above, the above formulations do not account for target motions. It can be understood that frequency resolution can be driven by target velocity (Doppler) estimation considerations. In addition, one can choose smaller range resolution and hence greater total bandwidth to reduce reverberation. The range resolution can be sufficiently small such that the target strength of the scattering volume or surface is small compared to the target strength of the target of interest. Also, the range resolution can be chosen so as not to over resolve the target or highlights or scattering centers on the target of interest. Further, in determining the initial frequency, effectively the carrier frequency for B<<$f_0$, additional considerations beyond those known for pulsed sonar can be contemplated. These can include selecting $f_0$ large enough such that a sound projector with practical fraction bandwidth can provide the desired absolute bandwidth, B, and that demodulation down to intermediate frequency is possible.

Figure 4:
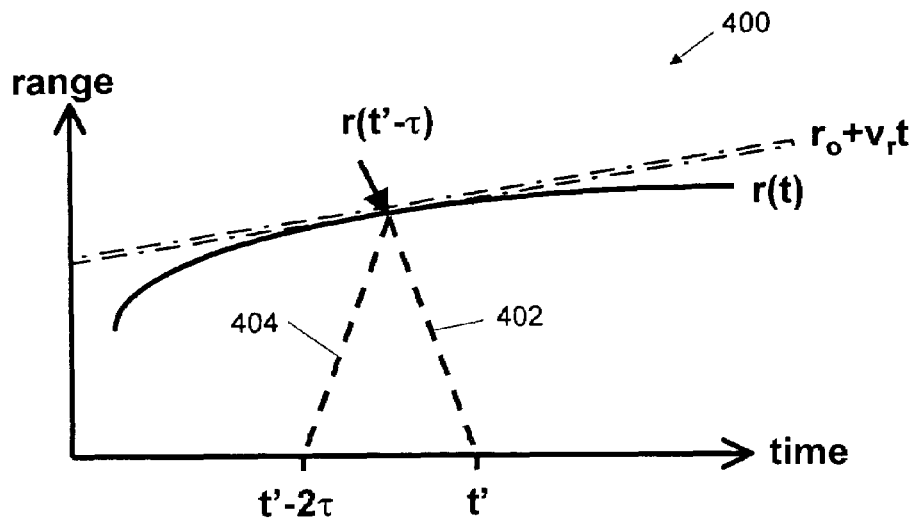
FIG. 4 illustrates a range-time diagram for a moving target.

The above formulations can be extended to a moving target. The movement of the target can result in time scale distortion of the echo from the target. With reference to FIG. 4, a plot 400 of range versus time is shown. The echo 402 received at time t' can be seen to have been reflected off a target at a time τ earlier. In general, the echo 402 at a time t', can equal the signal 404 at a time (t'-2τ): e(t')=s(t'-2τ), and cτ=r(t'-τ). For first order linearization of the target range/time trajectory at any given time, $r(t)=r_0+v_r t$, $c\tau=r_0+v_r(t'-\tau)$, and thus $$\tau = \frac{r_0 + v_r t'}{c + v_r} = \frac{r(t')}{c} \frac{1}{1 + M_r}, \text{ and} \quad [12]$$

$$e(t) = s\left[t - \frac{2r(t)}{c(1 + M_r)}\right] = s\left[t\left(\frac{1 - M_r}{1 + M_r}\right) - \frac{2r_0}{c}\left(\frac{1}{1 + M_r}\right)\right],$$

where $M_r(t) \equiv \dot{r}(t)/c = v_r(t)/c$: the rangewise Mach number.

Using the known relationships for LFM transmit signal phase:

$$\phi_{xmit}(t) = \omega_o t + \frac{1}{2}\dot{\omega}_o t^2 = 2\pi\left(f_o t + \frac{1}{2}\dot{f}_o t^2\right);$$

and instantaneous frequency:

$$f_{xmit}(t) = \frac{1}{2\pi}\dot{\phi}(t) = f_o + \dot{f}_o t,$$

the echo instantaneous phase and frequency can be derived from Equation 12:

$$\phi_{echo}(t) = 2\pi\left\{f_o\left[t - \frac{2r(t)}{c(1 + M_r)}\right] + \frac{1}{2}\dot{f}_o\left[t - \frac{2r(t)}{c(1 + M_r)}\right]^2\right\}; \text{ and} \quad [13]$$

$$f_{echo}(t) = \frac{1}{2\pi}\dot{\phi}(t) = \left\{f_o + \dot{f}_o\left[t - \frac{2r(t)}{c(1 + M_r)}\right]\right\}\left(\frac{1 - M_r}{1 + M_r}\right),$$

respectively. With $r(t)=r_0+v_r t$, then Equation 13 can be specialized to:

$$f_{echo}(t) = \left\{f_o + \dot{f}_o\left[t\left(\frac{1 - M_r}{1 + M_r}\right) - \frac{2r_o/c}{(1 + M_r)}\right]\right\}\left(\frac{1 - M_r}{1 + M_r}\right), \quad [14]$$

where the terms within the brackets, [ ], represent the second compound Doppler shift on the rate of change of frequency and the Doppler modified propagation time delay, respectively. The term outside the brackets, { }, represents the first overall Doppler shift on the instantaneous frequency. It can be understood that linearization of the time dependency of r(t) about a current target location is valid for sufficiently short observation time, with "sufficiently short" being dependent on the actual target kinematics and measurement resolution.

From Equation 14, the instantaneous difference frequency for a constant range rate target can be determined as:

$$\Delta f(t) = f_{echo}(t) - f_{xmit}(t) = \left[-\frac{2r_o}{c}\dot{f}_o\left(\frac{1 - M_r}{1 + M_r}\right) - 2M_r f_o - \right. \quad [15]$$

-continued
$$\left(\frac{4M}{1+M_r}\right)\dot{f}_o t\right]\frac{1}{(1+M_r)},$$

where $$f_{xmit}(t) = \frac{1}{2\pi}\dot{\phi}(t) = f_o + \dot{f}_o t \quad \text{and} \quad \dot{f}_o \equiv \frac{B}{T},$$

as before. For $M_r \ll 1$, Equation 15 is well approximated by:

$$\Delta f(t) \cong \left[-\frac{2r}{c}\dot{f}_o(1-2M_r) - 2M_r f_o - 4M_r(1-M_r)\dot{f}_o t\right](1-M_r). \quad [16a]$$

The three terms within the brackets [ ] of Equation 16a respectively represent a range proportional term, a Doppler shift term dependent only on range rate, and the LFM variation term, which is dependent only on range rate. The first and second time independent terms represent an ambiguity between range and range rate.

Figure 5:
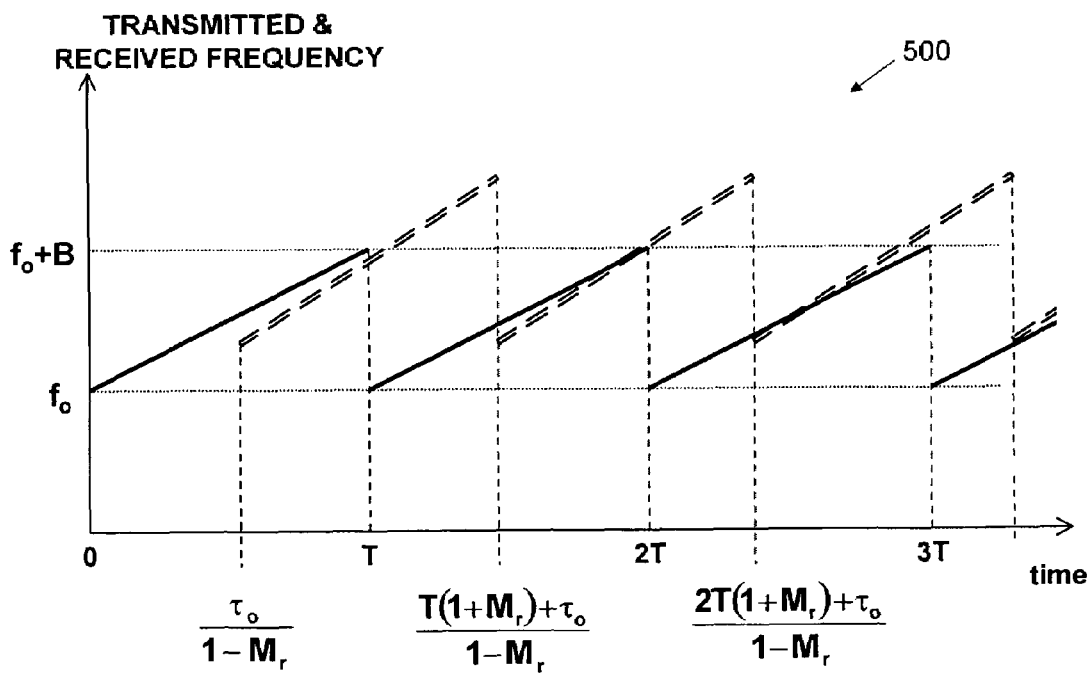
FIG. 5 illustrates a frequency-time track for a transmitted upsweep CTFM waveform and the echo waveform for a moving target.
Figure 6:
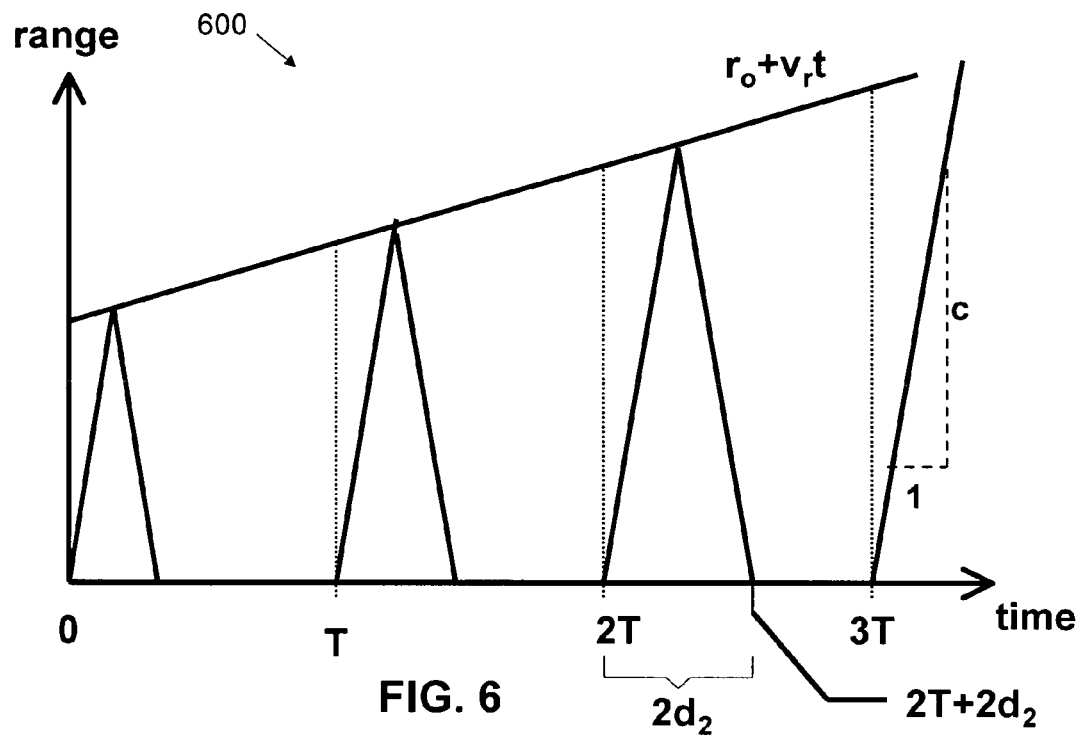
FIG. 6 is a range-time diagram illustrating the migration of the echo return start and stop times relative to transmission cycle.

The impact of target motion on the echo frequency can be such that the LFM variation term in the base band frequency, $\Delta f$, can cause some loss in processing gain for an exact replica correlator, as shown in the closing target example 500 of FIG. 5 for $M_r<0$. The migration of the echo return start and stop times relative to transmission cycle can be illustrated in plot 600 of FIG. 6. The echo start/stop times can be derived from the following:

$$r_o + v_r(NT+d_N) = c \cdot d_N;$$

$$r_o + v_r NT = (c-v_r)d_N;$$

$$d_N = \frac{r_o + v_r NT}{(c-v_r)} = \frac{\frac{r_o}{c} + NTM_r}{1-M_r}; \text{ and}$$

$$NT + 2d_N = \frac{\tau_o + (1+M_r)NT}{1-M_r},$$

where $2d_N$ is the time of flight for the beginning of the $N^{th}$ cycle transmit waveform to travel to the target and return.

The ambiguity between the range and range rate in Equation 16a is illustrated with the following example:
$f_0$: 20 kHz;
target max. range rate: 100 km/hr (55 kt)=28 m/sec→$M_r<0.02$;
max. range: 6 km;
sweep bandwidth: 600 Hz and cycle period: 8 sec →$df_0/dt=B/T=600$ Hz/8 sec=75 Hz/sec.

From Equation 16a and noting that $$\dot{f}_o \equiv \frac{B}{T},$$

we can obtain
$B(1-2M_r) \sim 564$ Hz;
$2M_r f_0 < 800$ Hz; and
$4M_r(1-M_r)B \approx 48$ Hz, noting the significant ambiguity between the first range dependent term and the second range rate dependent term.

It can be seen from Equation 16a that if the LFM variation term, $$f_{sweep} = 4M_r(1-M_r)\dot{f}_o t, \quad [16]$$

can be resolved and accurately measured, then $M_r$ can be uniquely determined using Equation 16a. Knowing $M_r$, $\Delta f$ and the transmit signal parameters, range can be determined unambiguously using Equation 16c:

$$r = -\frac{c}{2\dot{f}_o(1-2M_r)}\left[\frac{\Delta f}{(1-M_r)} + 2M_r f_o + 4M_r(1-M_r)\dot{f}_o T_0\right] \quad [16c]$$

However, in order to avoid spreading the LFM variation term power over more than one detection cell at baseband, the minimum bandwidth and/or the time duration of the frequency detection bin should be appropriately chosen as described in the following.

For observation time $T_0$, the sweep of the demodulated echo frequency can be approximated by $4M_r f_0 T_0 = 4M_r B(T_0/T) = 4M_r Q(T_0/T) \cdot \delta f$ for $B = Q \cdot \delta f$. To determine the maximum time the demodulated echo is in a single detection bin, $f_{sweep}/\delta f$ can be set equal to one to yield $T_0/T = 1/4M_r Q$.

Thus, for high speed targets (large $M_r$), and/or large numbers of range resolution cells, $\delta r$, within the maximum range, $R_{max}$, the sweep can be over many detection bins. For example, if $M_r = 0.02$ and $Q = 100$, then sweep/$\delta f \cong 4M_r Q = 8$. Spreading over multiple frequency bins in any one time resolution bin can degrade range resolution. Overly wide bins can admit more noise than necessary and can be demanding on source bandwidth.

Thus, for the application of concern, the baseband echo frequency can sweep over multiple detection frequency bins within a continuous transmit cycle for a maximum range rate target. This can result in not being able to capture signal energy in cycle time T by integrating echo baseband power in a single frequency resolution bin. In order to capture the total signal energy in a cycle, one can combine energy in frequency-time bins along range rate hypothesis tracks as illustrated in plot 700 of FIG. 7. The number of hypothetical tracks can depend on the maximum expected range rate and the range rate resolution.

Based on the above constraint, one can state that the detection bin bandwidth can be greater than or equal to the sweep rate times the minimum observation time, or $$\delta f \geq \left(\frac{4M_r B}{T}\right) \cdot \left(\frac{1}{\delta f}\right) \rightarrow \delta f \geq \sqrt{4M_r\left(\frac{B}{T}\right)} = \delta f_{min}. \quad [17]$$

Using the relation $B = Q \cdot \delta f$, we can obtain:

$$\frac{B_{min}}{Q} = \sqrt{4M_r\left(\frac{B_{min}}{T}\right)} \rightarrow B_{min} = \frac{4M_r Q^2}{T} \text{ and} \quad [18]$$

-continued $$\delta f_{min} = \frac{B_{min}}{Q} = \frac{4M_r Q}{T} = 4M_r\left(\frac{Q}{T}\right) = 4M_r\left(\frac{R_{max}/\delta r}{2R_{max}/c}\right) = \frac{2v_r}{\delta r}. \quad [19]$$

Figure 7:
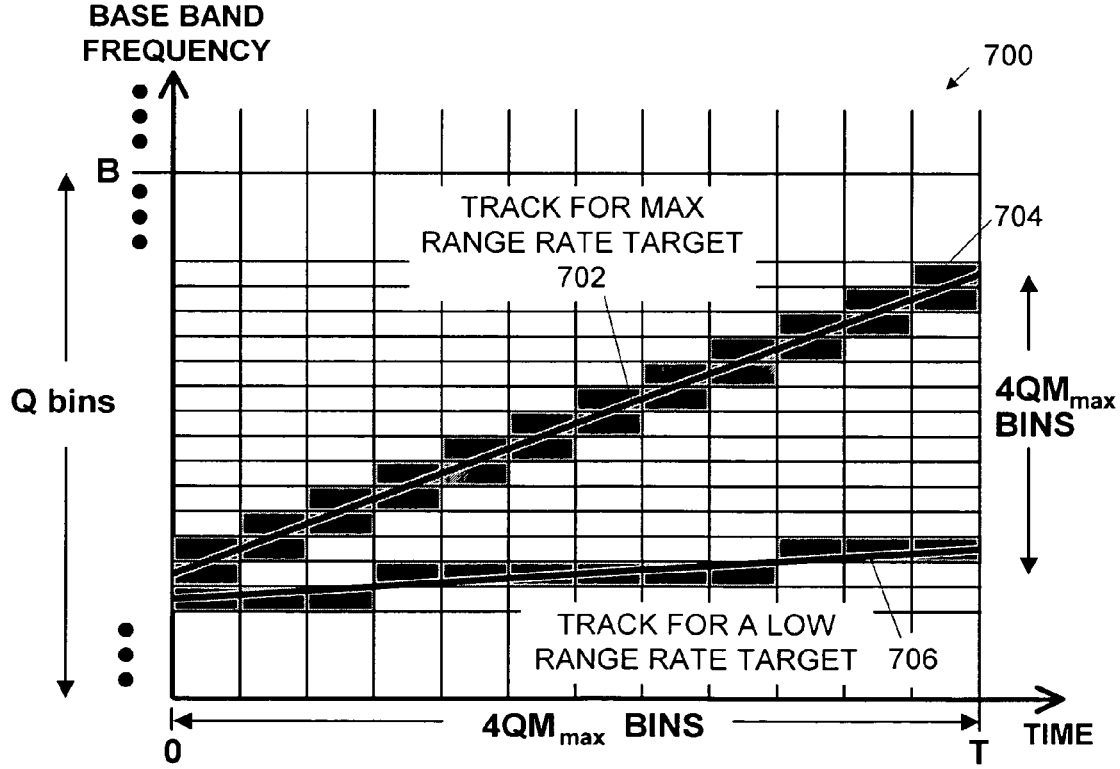
FIG. 7 illustrates a baseband echo frequency-time track.

FIG. 7 provides an example baseband echo frequency-time track using the above criterion to select the frequency and consequent minimum time resolutions so that a maximum range rate target does not spread over more than two frequency cells at any one time, as shown by track 702 and cross-hatched frequency cells 704.

Figure 2:
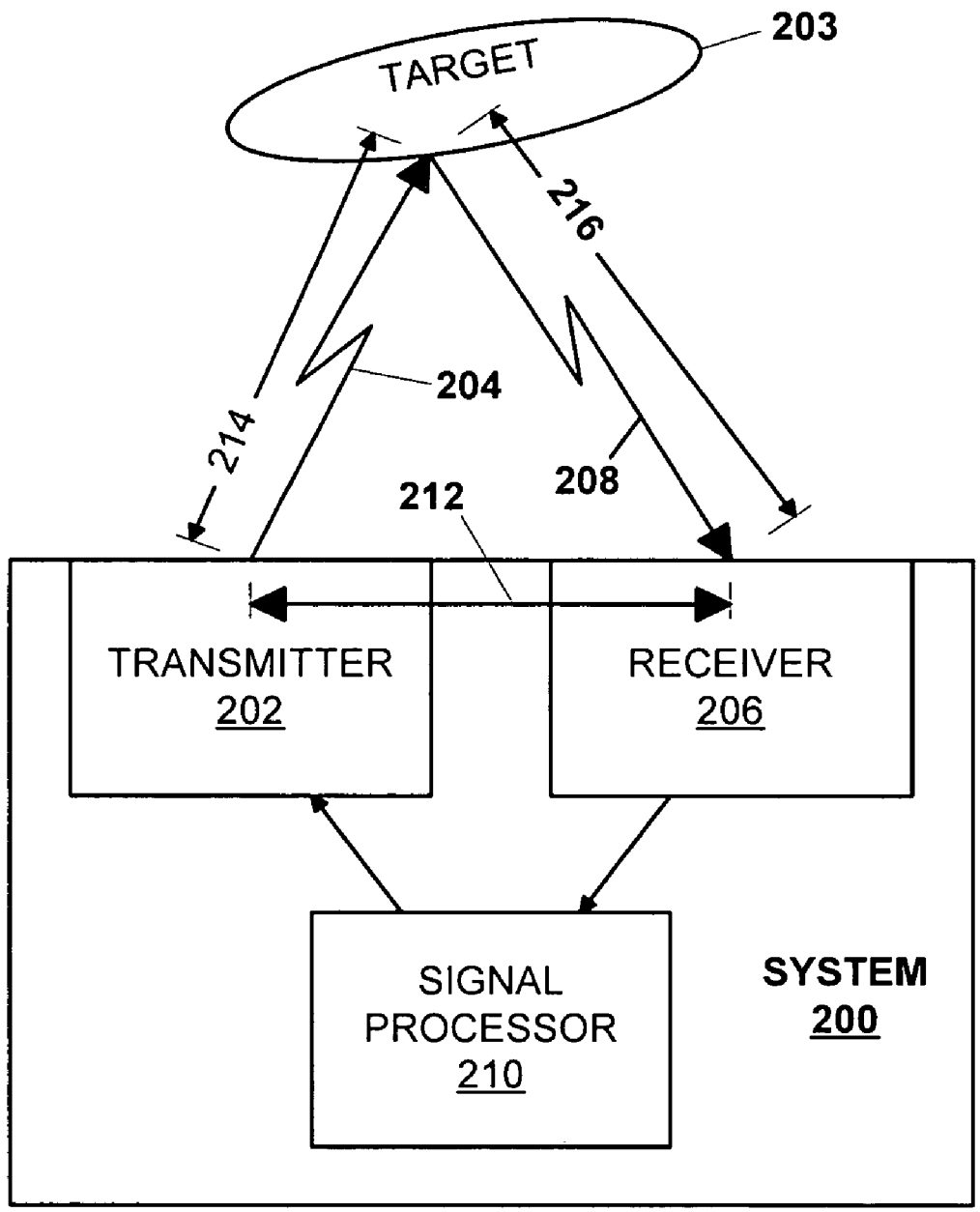
FIG. 2 illustrates a system for continuously transmitting and receiving continuous wave signals.

FIG. 1A illustrates a flow chart for a method 100 for localizing a moving target using a monostatic CTFM system 200, schematically illustrated in FIG. 2. System 200 can include a transmitter 202 for generating a continuous wave signal 204, a directional receiver 206 for determining arrival angle and receiving an echo 208 reflected from a target 3, and a signal processor 210. The distance 212 between the transmitter 202 and receiver 206 is very small compared to the distance 24 between transmitter 202 and target 3 or target 3 and receiver 206. The equivalent equations for a bistatic CTFM can be derived in manner completely analogous to that for a Monostatic system. Method 100 can start with the transmission (102) of continuous wave signal 204 from transmitter 202 as described by Equation 4.

Using the previously described relationships, signal processor 210 can determine (104) frequency resolution bins and time resolution bins such that a maximum range rate target does not spread over more than two frequency cells at one time and a range resolution can be specified using Equation 19. Upon receiving echo 208 as described by Equation 13, as at 106 of FIG. 1A, signal processor 210 can demodulate the echo 208 to baseband by mixing echo 208 with transmit signal 204 as described by Equation 15, as at 108 of FIG. 1A. The demodulation can eliminate dead time using dual extended duration interlaced demodulation signals, or dual frequency band demodulation signals. In one embodiment, processor 210 can demodulate echo 208 to an intermediate frequency, or pass band with dual frequency band demodulation reference signals, as indicated in phantom at 108A. Processor 210 can band pass the desired signal, as at 108B, and perform a second demodulation 108 that can bring the echo tonal in the pass band down to the baseband.

Signal processor 210 can estimate, at 110, the frequency difference, Δf, by measurement using standard frequency domain digital signal processing techniques to select the frequency bin containing the highest power spectral density. Signal processor 210 can combine energy in the cells 704 along hypothesized tracks in the frequency-time diagram (e.g., maximum range rate target track 702 and low range rate target track 706, FIG. 7) for echo 208 to obtain an estimate for the rangewise Mach number, $M_r$, using Equation 16b as at 112. Combining energy in cells can improve signal to noise ratio and improve estimates of $M_r$. The target range, shown as 214 or 216 for a Monostatic case in FIG. 2, can be determined unambiguously using Equation 16c at 114 and method 100 can end.

In one embodiment, a set of LFM matched filters at baseband can capture the total signal energy in a cycle. However, it can be noted that the LFM rate of the demodulated echo due to target motion can be much less than the LFM rate of transmission. For each initial frequency, or range, detection cell, there can be on the order of $2 \cdot 4M_{max}Q$ range rate hypothesis tracks or matched filters. A very high resolution matched filter can be used to estimate $M_r$ from the LFM component of the baseband echo frequency. However, since the time-frequency track is roughly known from the coarser frequency resolution bins used for detection, as above, there can be a manageably small number of long duration, high resolution filters matched to the $M_r$ hypotheses with the coarser resolution track. Sufficient accuracy in estimating $M_r$ can ensure that the error in the estimate of the $2M_r f_0$ term in Equation 16a is small compared to the selected frequency resolution, δf: $\delta f \gg 2\epsilon_{M_r} f_0$, where ">>" can be interpreted as "greater than by a factor of two or more". Estimating $M_r$ by coherent matched filtering of the baseband frequency Δf with various LFM matched filter hypotheses can have nominal resolution of ~1/(4BT) and, hence, at a SNR just sufficient for detection:

$$\epsilon_{M_r} \cong \frac{1}{4BT} \rightarrow 2\epsilon_{M_r} f_0 = \frac{f_0}{2BT} \rightarrow \delta f \gg \quad [20]$$

$$\frac{f_0}{2BT} \rightarrow \delta f \cdot T \gg \frac{f_0}{2B} \gg 1, \text{ typically.}$$

Since smearing of the echo energy across fixed frequency-time resolution cells is not an issue with matched filtering to the LFM component of the baseband echo, the SNR can be maximized by selecting the absolute minimum frequency resolution consistent with observation time T: δf=1/T. However, it can be seen that this selection is not consistent with the above criterion for range/Doppler ambiguity resolution. Therefore, a larger value of frequency resolution, with attendant loss of SNR, can be used in order to disambiguate range and range rate using the matched filters.

From Equation 20, $$\delta f \gg \frac{f_0}{2BT} = \frac{f_0}{2Q \cdot \delta f \cdot T},$$

or $$\delta f \gg \sqrt{\frac{f_0}{2QT}} \rightarrow \delta f_{min} \cong \frac{1}{2}\sqrt{\frac{f_0}{2QT}} = \sqrt{\frac{2f_0}{QT}}. \quad [21]$$

Thus, δf can be chosen as the greater of the value of $\delta f_{min}$ from Equation 21, or from the criterion to prevent spreading of the frequency over multiple bins at one time, $$\delta f_{min} = \frac{4M_r Q}{T}$$

at Equation 19, as described previously. As an example, given T=5 secs; $f_0$=20 kHz; and Q=200, then δf>>3.2 Hz→$\delta f_{min}$≅6.4 Hz.

Thus, the matched filters described above can provide an alternative method for estimating $M_r$.

In one alternative embodiment, concurrent upsweep and downsweep transmissions can be used to resolve the range/range rate ambiguity. The transmissions can be identical except for the sign on the rate of change of frequency:

$$\Delta f_u(t) = -\tau_0 f_0(1-2M_r) - 2M_s f_0 - 4M_r(1-M_r)f_0 t, \text{and} \quad [22]$$

$$\Delta f_d(t) = +\tau_0 f_0(1-2M_r) - 2M_s f_0 + 4M_r(1-M_r)f_0 t, \text{ and} \quad [23]$$

The sum and difference of frequencies of the demodulated echoes can disambiguate the range and range rate:

$$\Delta f_d(t) + \Delta f_u(t) = -4M_r f_0, \text{ and} \quad [24]$$

$$\Delta f_d(t) - \Delta f_u(t) = +2\tau_0(1-2M_r) + 8M_r(1-M_r)f_0 t. \quad [25]$$

Figure 8:
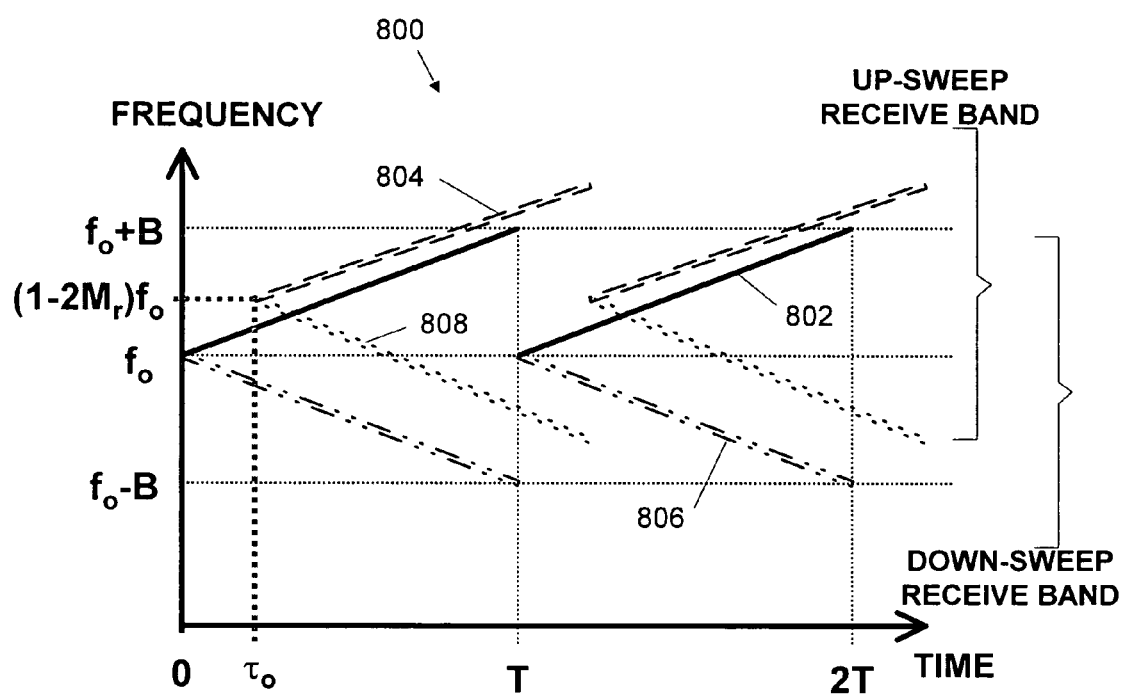
FIG. 8 illustrates a frequency-time track for transmitted upsweep and downsweep waveforms and the echo waveforms.

It can be seen that the sum term of Equation 24 can be independent of range and dependent only on range rate. In addition, the difference terms of Equation 25 do not contain a large Doppler shift term. Plot 800 of FIG. 8 illustrates the upsweep (802, 804) and downsweep (806, 808) transmissions and echoes, respectively.

As described above, the concurrent upsweep and downsweep transmissions method doubles the source level and bandwidth requirements, or reduces source level bandwidth available for upsweep and downsweep transmission. It can also be noted that since the demodulated echo frequencies are time varying, the above summing and differencing operations are performed on frequencies measured with time resolution shorter than the full cycle time. Further, since the upsweep and downsweep transmissions are in different bands, $f_0$ to ($f_0$+B) and $f_0$ to ($f_0$-B), respectively, the upsweep and downsweep echoes can also be in different bands. However, Doppler shifting of the boundary between bands from $f_0$ to $f_0(1-2M_r)$ can result in the lack of a priori knowledge of the boundary between echo bands, which can prevent separation of the echoes from the upsweep and downsweep transmissions by filtering.

Separation of the cycle start frequencies by an amount larger than the potential Doppler shift (Equation 27) can allow separation of the upsweep and downsweep echoes by filtering:

$$f_u = f_1 + f_0 t \text{ and } f_d = f_2 + f_0 t, \text{ where} \quad [26]$$

$$f_1 - f_2 = 4M_{max} f_0 \text{ and } f_0 \equiv \left(\frac{f_1 + f_2}{2}\right). \quad [27]$$

The echoes can be demodulated to baseband using their respective transmit signals as appropriate reference signals. The upsweep and downsweep echo frequencies at baseband can be combined to determine range and range rate unambiguously. Substituting from Equation 9 and Equation 27 into Equations 22 and 23 provides:

$$\Delta f_u(t) = -\frac{2r}{c} \dot{f}_0 (1 - 2M_r) - 2M_r f_1 - 4M_r(1 - M_r) \dot{f}_0 t, \text{ and} \quad [28]$$

$$\Delta f_d(t) = +\frac{2r}{c} \dot{f}_0 (1 - 2M_r) - 2M_r f_2 + 4M_r(1 - M_r) \dot{f}_0 t, \text{ thus} \quad [29]$$

$$\Delta f_d(t) + \Delta f_u(t) = -2M_r(f_2 + f_1), \text{ and} \quad [30]$$

$$\Delta f_d(t) - \Delta f_u(t) = +\frac{4r}{c} \dot{f}_0 (1 - 2M_r) + \quad [31]$$
$$8M_r(1 - M_r) \dot{f}_0 t - 2M_r(f_2 - f_1).$$

The frequency resolution for range/range rate ambiguity resolution can be determined using an approximation of Equation 25 for an initial analysis:

$$\Delta f_d(t) - \Delta f_u(t) \equiv \Delta f_\Delta \quad [32]$$

$$\cong +2\tau_0 \dot{f}_0 + 8M_r \dot{f}_0 t$$

$$= 2\tau_0 \dot{f}_0 - 2\frac{\dot{f}_0}{f_0} \Delta f_\Sigma t$$

$$= 2\dot{f}_0 \left(\tau_0 - \frac{\Delta f_\Sigma}{f_0} t\right),$$

where $\Delta f_\Sigma \equiv \Delta f_d(t) + \Delta f_u(t) = -4M_r f_0$. From Equation 32, we can obtain:

$$\tau_0 = \frac{\Delta f_\Delta}{2B} T + \frac{\Delta f_\Sigma}{f_0} t = \left(\frac{T}{2B} + \frac{t}{f_0}\right) \Delta f_d + \left(\frac{T}{2B} - \frac{t}{f_0}\right) \Delta f_u,$$

which yields:

$$\varepsilon_{\tau_0} = \left(\frac{T}{2B} + \frac{t}{f_0}\right) \varepsilon_{\Delta f_d} + \left(\frac{T}{2B} - \frac{t}{f_0}\right) \varepsilon_{\Delta f_u};$$

and for $B \ll f_0$, $$\varepsilon_{\tau_0} \cong \left(\frac{T}{2B}\right) \varepsilon_{\Delta f_d} + \varepsilon_{\Delta f_u} \cong \frac{T}{B} \delta f.$$

Noting that with $$\varepsilon_r = \frac{c}{2} \varepsilon_{\tau_0},$$

then $$\frac{\varepsilon_r}{\delta r} = \frac{c}{2} \frac{\varepsilon_{\tau_0}}{\delta r} = \frac{c}{2} \frac{T \cdot \delta f}{\delta r \cdot B} = \frac{R_{max}}{\delta r} \frac{\delta f}{B} = Q \cdot \frac{1}{Q} = 1$$

can confirm that, to a first order of approximation, the range error with a dual upsweep and downsweep waveform can be about the same as the desired range resolution.

The use of concurrent upsweep and downsweep transmissions can present issues to be considered. First, target strength can fluctuate with frequency for realistic time (range) spread targets. The transmission loss can also fluctuate with frequency due to multi-path propagation. However, the large bandwidth of a CT system can average over frequency fluctuations and can provide more robust performance against fluctuating or fading targets than a pulsed CW system. A further consideration can result from the concurrent measurements of the upsweep and downsweep echoes. Since the upsweep and downsweep frequencies can be well separated, the strength of one of the echoes in a short time frame for a fading or frequency fluctuating target can be weak.

FIG. 1B illustrates a flow chart for a method 150 for localizing a moving target using a monostatic CTFM system 200, as schematically illustrated in FIG. 2, with transmitter 202 concurrently generating upsweep and downsweep continuous wave signals 204. Method 150 can start by determining a separation between the cycle start frequencies using Equation 27, as at 152. Signal processor 210 can determine the separation based on maintaining the separation larger than the potential Doppler shift (Equation 27). Transmitter 202 can transmit the determined upsweep and downsweep signals using Equation 26, as at 154. It can be understood that transmitter 202 can include one or more transmitters for providing separate upsweep and downsweep transmission signals.

Echoes 208 for the upsweep and downsweep signals (Equation 13) can be received at receiver 206, as indicated at 156 of FIG. 1B. It can be understood that receiver 206 can include one or more receiver processing channels and that separate processing channels can be used for down and up Doppler targets, corresponding to closing and opening targets, respectively. Signal processor 210 can demodulate (158) the upsweep (Equation 28) and downsweep (Equation 29) echoes to baseband using separate appropriate references, as described previously. Signal processor 210 can combine the upsweep and downsweep echo frequencies at baseband, as at 160, to estimate by measurement the sum and difference frequencies. The range can then be unambiguously determined at a time, t, using the difference frequency, the range rate and Equation 31, as indicated at 162 of FIG. 1B, and method 150 can end.

The systems and implementations thereof described herein may not be limited to particular components or configurations. For example, signal processor 210 can include one or more processors configured to provide the operations described above. In addition transmitter 202 and receiver 206 can be configured separately or combined together and/or with signal processor 210. Separate components can be networked together. System 200 can include volatile memory and non-volatile memory for storing data corresponding to input and/or output values and other intermediate computations for the methods 100 and 150. Data can be stored in one or databases. The memory can include instructions for executing the methods 100 and 150, which can be transferred, in the course of operation, from the non-volatile memory to the volatile memory and to the processor for execution.

Additionally, the flow charts in FIGS. 1A and 1B can illustrate an exemplary implementation of the features of system 200 and other configurations can be contemplated and/or other actions, decisions, and the like can be included. For example, an operator of system 200 can be given the option to choose method 100 or method 150 for determining range, with transmitter 202 providing the appropriate signals and receiver 206 and signal processor 210 configured for both modes of operation. Additionally, results from method 100 and method 150 can be compared and/or otherwise combined to assist in improving system 200 accuracy.

The systems and methods described herein may not be limited to a particular hardware or software configuration; they may find applicability in many computing or processing environments. They can be implemented in hardware or software, or a combination thereof. Preferably, the methods 100 and 150 can be implemented in computer programs running in one or more processors. Implementation languages for the computer programs can include high level procedural languages, object oriented programming languages, assembly and/or machine language for communication with a computer system.

The computer programs can be stored on a storage media and/or one or more devices (e.g., CD-ROM, hard disk, or magnetic disk) that are readable by a general or special purpose programmable computer for configuring and operating the computer when the storage medium or device is read by the computer to perform the procedures described herein. The system and methods can also be considered to be implemented as a computer-readable storage medium, configured with a computer program, where the storage medium so configured can cause a computer to operate in a specific and predefined manner.

References to "microprocessor" and/or "processor" can be understood to include one or more microprocessors that can communicate in a stand-alone and/or a distributed environment(s), and can thus can be configured to communicate via wired or wireless communications with other processors, where such processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

While the method and systems have been disclosed in connection with the preferred embodiments shown and described in detail, various modifications and improvements thereon will become readily apparent to those skilled in the art. Those with ordinary skill in the art will recognize that the arrangement and connectivity of the components shown in the figures are merely for illustrative purposes, and can be varied accordingly and components may be combined or otherwise reconfigured without departing from the scope of the disclosed systems and methods.

Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:

1. A method of localizing a target comprising:
    transmitting a continuous waveform signal;
    receiving an echo signal from said target;
    demodulating said echo signal to a baseband to obtain a demodulated echo signal;
    estimating a rangewise Mach number, $M_r$, based on combining energy in cells along hypothesized tracks of a frequency-time diagram for said demodulated echo signal; and
    determining a first range of said target based on said rangewise Mach number.

2. The method of claim 1, wherein estimating a rangewise Mach number comprises choosing a frequency detection binwidth, $\delta f_{min}$, for said cells from a ratio between a minimum bandwidth of said continuous waveform signal, and a number of said cells in a cycle time, T.

3. The method of claim 1, wherein estimating a rangewise Mach number comprises using matched filters having a minimum baseband frequency resolution, $\delta f_{min}$, based on a ratio of an initial frequency of said continuous waveform signal, and a number of said cells in a cycle time, T.

4. The method of claim 1, wherein demodulating comprises mixing said echo signal with said continuous waveform signal using at least one of dual extended duration interlaced demodulation signals, and dual frequency band demodulation signals.

5. The method of claim 1, wherein demodulating comprises:
mixing said echo signal with said continuous waveform signal using dual frequency band demodulation reference signals to demodulate said echo signal to a pass band to obtain a demodulated echo signal; and
demodulating said demodulated echo signal to bring said demodulated echo signal down to said baseband.

6. The method of claim 5 further comprising band passing said demodulated echo signal.

7. The method of claim 1, wherein transmitting said continuous waveform signal further comprises:
determining a frequency separation;
transmitting a continuous waveform upsweep signal; and
transmitting a concurrent continuous waveform downsweep signal, said upsweep signal and said downsweep signal having said frequency separation.

8. The method of claim 7, wherein demodulating said echo signal further comprises:
demodulating an upsweep echo signal to baseband to obtain an upsweep baseband frequency for said upsweep echo signal; and
demodulating a downsweep echo signal to baseband to obtain a downsweep baseband frequency for said downsweep echo signal.

9. The method of claim 8, wherein determining a range further comprises combining said upsweep baseband frequency and said downsweep baseband frequency to determine a range rate and a second range of said target.

10. The method of claim 9, wherein combining said upsweep baseband frequency and said downsweep baseband frequency comprises:
determining a sum and a difference of said upsweep baseband frequency and said downsweep baseband frequency to determine said range rate and said second range, respectively, of said target; and
combining said first range and said second range to localize said target.

11. The method of claim 1, wherein determining said first range comprises:
estimating a frequency difference, $\Delta f$, between said transmit signal and said echo signal; and
solving for said range using the relationship:

$$r = -\frac{c}{2\dot{f}_o(1-2M_r)}\left[\frac{\Delta f}{(1-M_r)} + 2M_r f_o + 4M_r(1-M_r)\dot{f}_o T_0\right],$$

where
$f_o$ is an initial frequency of said continuous waveform signal, and
$T_0$ is and observation time less than a cycle time T.

12. A system for localizing a target comprising:
a transmitter to transmit a continuous waveform signal;
a receiver to receive an echo signal from said target; and
a signal processor to demodulate said echo signal to baseband, estimate a rangewise Mach number, $M_r$, based on combining energy in cells along hypothesized tracks of a frequency-time diagram for said demodulated echo signal, and determine a range of said target based on said rangewise Mach number.

13. A system for localizing a target comprising:
means for transmitting a continuous waveform signal;
means for receiving an echo signal from said target;
means for demodulating said echo signal to baseband;
means for estimating a rangewise Mach number, $M_r$, based on combining energy in cells along hypothesized tracks of a frequency-time diagram for said demodulated echo signal;
means for determining a range of said target based on said rangewise Mach number.

14. A computer-readable medium containing instructions for controlling a computer system to localize a target by controlling said computer system to:
transmit a continuous waveform signal;
receive an echo signal from said target;
demodulate said echo signal to baseband;
estimate a rangewise Mach number, $M_r$, based on combining energy in cells along hypothesized tracks of a frequency-time diagram for said demodulated echo signal; and
determine a range of said target based on said rangewise Mach number.

15. The computer-readable medium of claim 14, wherein said instructions to estimate a rangewise Mach number comprise instructions to choose a frequency detection binwidth, $\delta f_{min}$, for said cells from a ratio of a minimum bandwidth of said continuous waveform signal, and a number of said cells in a cycle time, T.

16. The computer-readable medium of claim 14, wherein said instructions to estimate a rangewise Mach number comprise instructions to use matched filters having a minimum baseband frequency resolution, $\delta f_{min}$, based on a ratio of an initial frequency of said continuous waveform signal, and a number of said cells in a cycle time, T.

17. The computer-readable medium of claim 14, wherein said instructions to demodulate comprise instructions to mix said echo signal with said continuous waveform signal using at least one of dual extended duration interlaced demodulation signals, and dual frequency band demodulation signals.

18. The computer-readable medium of claim 14, wherein said instructions to demodulate comprise instructions to:
mix said echo signal with said continuous waveform signal using dual frequency band demodulation reference signals to demodulate said echo signal to a pass band to obtain a demodulated echo signal; and
demodulate said demodulated echo signal to bring said demodulated echo signal down to said baseband.

19. The computer-readable medium of claim 18 further comprising instructions to band pass said demodulated echo signal.

20. The computer-readable medium of claim 14, wherein said instructions to transmit said continuous waveform signal further comprise instructions to:
determine a frequency separation;
transmit a continuous waveform upsweep signal; and
transmit a concurrent continuous waveform downsweep signal, said upsweep signal and said downsweep signal having said frequency separation.

21. The computer-readable medium of claim 20, wherein said instructions to demodulate said echo signal further comprise instructions to:
- demodulate an upsweep echo signal to baseband to obtain an upsweep baseband frequency for said upsweep echo signal; and
- demodulate a downsweep echo signal to baseband to obtain a downsweep baseband frequency for said downsweep echo signal.

22. The computer-readable medium of claim 21, wherein said instructions to determine a range further comprise instructions to combine said upsweep baseband frequency and said downsweep baseband frequency to determine a range rate and a second range of said target.

23. The computer-readable medium of claim 22, wherein said instructions to combine said upsweep baseband frequency and said downsweep baseband frequency comprise instructions to:
- determine a sum and a difference of said upsweep baseband frequency and said downsweep baseband frequency to determine said range rate and said second range, respectively, of said target; and
- combine said first range and said second range to localize said target.

24. The computer-readable medium of claim 14, wherein said instructions to determine said first range comprise instructions to:
- estimate a frequency difference, $\Delta f$, between said transmit signal and said echo signal; and
- solve for said range using the relationship:

$$r = -\frac{c}{2\dot{f}_o(1-2M_r)}\left[\frac{\Delta f}{(1-M_r)} + 2M_r f_o + 4M_r(1-M_r)\dot{f}_o T_0\right],$$

where
- $f_o$ is an initial frequency of said continuous waveform signal, and
- $T_0$ is and observation time less than a cycle time T.

* * * * *